Feb. 28, 1961     H. J. CALHOUN     2,973,460
ADJUSTMENTS FOR COMPENSATOR RELAYING EQUIPMENTS
Filed Sept. 20, 1957
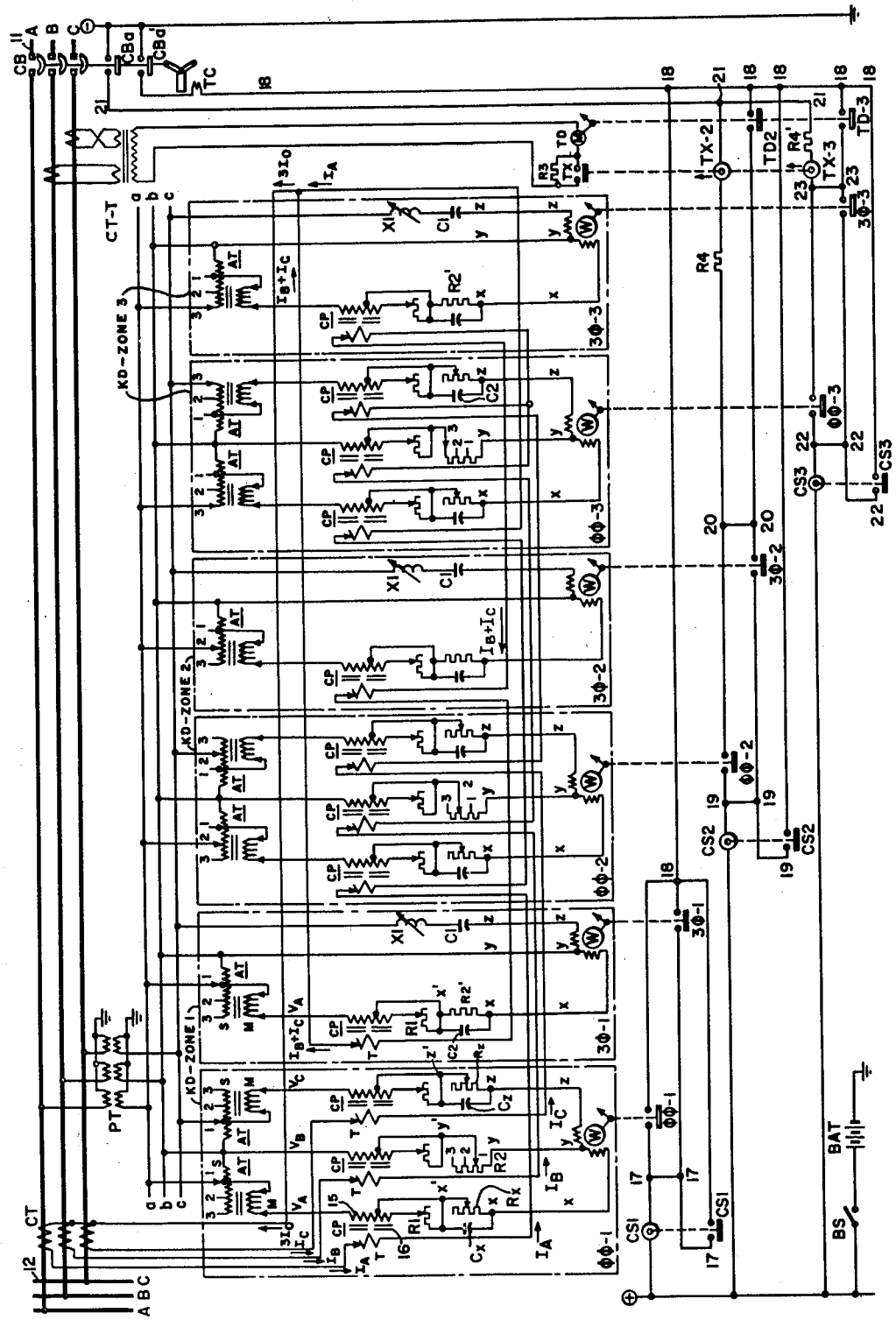

United States Patent Office 2,973,460
Patented Feb. 28, 1961

2,973,460

ADJUSTMENTS FOR COMPENSATOR RELAYING EQUIPMENTS

Howard J. Calhoun, Sayreville, N.J., assignor to Westinghouse Electric Corporation, East Pittsburgh, Pa., a corporation of Pennsylvania Filed Sept. 20, 1957, Ser. No. 685,167

16 Claims. (Cl. 317—47)

My invention relates to a protective relaying system which uses polyphase-responsive elements energized from polyphase compensated bus-voltages at the relaying station.

My invention is an improvement in a compensator relaying assembly which is described and claimed in an application of W. K. Sonnemann, Serial No. 685,155, filed September 20, 1957.

This assembly makes use of a new type of distance relay for the fault-protection of three-phase transmission-lines or power-lines by the use of a compensator or compensators, connected in series with the bus-voltages at the relaying station, and energized from one or more of the line-currents, for deriving a set of compensated three-phase relaying voltages which reproduce some aspect of the line-voltages at some predetermined fault-location in the power-line or system, in combination with polyphase-responsive relaying-means, energized from said compensated polyphase relaying voltages, for developing an operating component which is responsive to the magnitude of the negative-sequence component of said compensated three-phase relaying voltages, and a restraining component which is similarly responsive to the magnitude of the positive-sequence component of said compensated relaying voltages; or the relaying means may operate on the principle of a polyphase induction motor, energized from said compensated three-phase relaying voltages; or the relaying means may operate on the principle of a sine relay, energized from two of the phases of said compensated three-phase relaying voltages, for operating in response to the product of the magnitudes of said two phases, multiplied by the sine of the phase-angle between them.

Such a compensator relaying assembly has many advantages, including a great reduction in the number of relaying elements which are necessary for the protection of the power-line in each of the three distance-zones, zone 1, zone 2 and zone 3, which are commonly used is distance-relaying. Since the torque-producing element responds to phase-sequence components, a separate element is not needed for each phase.

The assembly of which my present invention forms a part has an additional advantage resulting from the fact that the polyphase-responsive compensated-voltage distance-responsive relaying-elements are inherently directional, thereby avoiding the need for a separate directional element or means, and eliminating the contact-coordination problem which is entailed by the use of separate distance and directional elements. This inherent directional response is obtained both at the balance-points of the distance-responsive elements and at the relaying bus, or more exactly, at the location of the line-current transformers.

In all types of compensated-voltage distance-relays using the general principles of my invention, the relay-response is zero if the fault is located exactly at the balance-point of the relay; if the fault is nearer than the balance-point, the negative-sequence component of the impressed relay-voltage is larger than the positive-sequence component, and the relay produces response in the operating direction; but if the fault is beyond the balance-point, the positive-sequence component is the larger, and the relay-response is the restraining direction. But since the polyphase-responsive relaying-element is very sensitive to small positive and negative-sequence components, the balance point can be set very accurately—more accurately than has heretofore been achieved.

My present invention relates to the preferred adjustment-features which are used in the above-described compensator relaying assembly. These adjustment-features include a novel means for separately adjusting the phase-angles and the impedance-magnitude of the compensators of all of the polyphase-responsive compensated-voltage phase-fault and three-phase-fault-responsive relaying-units which make up the assembly.

My new adjustment-features also include novel transient-suppressing circuits, both for the three-compensator phase-fault relaying-units which are generically described and claimed in the above-mentioned Sonnemann application, and for the single-compensator three-phase-fault-responsive relaying-units which are generically described and claimed in an application of S. L. Goldsborough, Serial No. 685,168, filed September 20, 1957, and which are specifically described and claimed, in an improved form, in an application of J. G. Chevalier, Serial No. 685,277, filed September 20, 1957.

Still more specifically, my invention relates to compensated-voltage relaying units and systems of the general types just described, in which the polyphase-responsive element is a multipolar torque-producing element using a cylindrical rotor, the multipolar element preferably having four poles which are so energized as to produce two diametrically flowing fluxes, each flux being responsive to one of the two compensated voltages which are applied to said torque-producing element. Such a torque-producing element is known to combine the advantages of a high operating-torque, and a low inertia, which together spell a high rate of response and great sensitivity of response, in combination with the elimination of the objectionable double-frequency pulsating torques. Since such a two-flux torque-producing element is not a balanced three-phase element, its energizing connections should be such as to provide no flow of zero-sequence current in the torque-producing element, so as to eliminate hybrid torques which are responsive to the products of the zero-sequence current multiplied by each of the two rotational-sequence currents, namely the positive-sequence current and the negative-sequence current, respectively, which would shift the balance-point of the element.

With the foregoing and other objects in view, my invention consists in the apparatus, circuits, combinations and methods of operation, hereinafter described and claimed and illustrated in the accompanying drawing, wherein the single figure is a diagrammatic view of the best form of embodiment of circuits and apparatus, which I at present prefer for embodying my invention in a non-carrier relaying equipment for protecting one terminal of a three-phase power-line against faults involving either two or three phases of the line.

In the drawing, I show my compensator relaying system, applied for the protection of a three-phase line-section 11, which is connected to a three-phase bus 12, at the relaying station, through a circuit breaker CB. A set of line-current transformers CT derive the line-currents $I_A$, $I_B$, $I_C$ and the star-point current $3I_0$ for relaying purposes, where $I_0$ is the zero-sequence component of the line-currents. A set of potential transformers PT is used for deriving the line or bus-voltages $a$, $b$ and $c$ for relaying purposes.

In the drawing, I show six relaying-units which I call type KD units, two for each of the three zones of protection, namely, a phase-fault unit for responding to all kinds of double-line faults, and a three-phase unit $3\phi$ for responding to three-phase faults, for each zone, the zones being indicated by appended numbers, such as the designation $\phi\phi-1$ for the first-zone phase-fault unit or element. I also show a time-delay element or timer TD, an auxiliary timer-starting relay TX, and three contactor-switches CS1, CS2 and CS3. The contacts of the circuit breaker CB and the various relay-elements are shown in their deenergized positions, and are regarded as being raised by the operation of the respective elements. The physical connections between the various relay-contacts and the various operating-coils of the respective relays are shown as dotted vertical stems, which are intended as a convention for indicating the mechanical connection between the parts of each relay-element. As a further convention, the same legends are applied, both to the force-producing or operating-member, and to the contact-members of each relay-element, to denote their relationship. The timer TD has two contacts, which are distinguished as TD2 and TD3, which close after different time-delays suitable for the second-zone and third-zone relays, respectively.

Each of the six illustrated relaying-units operates on compensated voltages. Since the amount of the mutual compensator-impedance, which is required in the alternating-current relaying circuits, is directly proportional to the value of the derived bus-voltage which is used in said relaying circuits, I have shown, in Fig. 1, a convenient means for aiding in adjusting the effective impedance-value of each compensator, by adjusting the value of the derived bus-voltage which is applied to the relaying circuits. To this end, I show a plurality of autotransformers AT, each having three adjustable primary-connection taps numbered 1, 2 and 3 on each main autotransformer-winding S. The secondary or output circuit of each auto-transformer is permanently connected to the tap S1, and this secondary circuit serially includes some fine-adjustment taps on a tertiary winding M of the autotransformer, which can add or subtract small fractional increments to the secondary voltage, according to the polarity of the connections to the M-taps. The output-circuit of the tertiary autotransformer-winding M produces the effective bus-voltage which is used in that phase of the relaying circuit.

In the preferred form of embodiment of my invention, which is shown in the accompanying drawing, each of the compensators CP is provided with a tapped primary winding T, having a small number of turns, and a secondary winding 15, having a large number of turns, these two windings being magnetically interlinked through an air-gapped core 16, so that the compensator-voltage which is generated in the secondary winding 15 will be substantially 90°, or less, out of phase with the current which traverses the primary winding T, depending upon the amount of effective resistance R1. The taps of the primary winding T of each compensator CP are numbered in various ohm-values which are so chosen that a correct replica of the positive-sequence line-impedance $Z_{BP}$ of the protected line 11, to a distance as far as the desired balance-point of the relay, will be obtained when $$Z_{BP} = \frac{TS}{1 \pm M}$$

where T, S and M are the numbers or fractional numbers which are marked on the chosen taps of the compensator-primary T, the main autotransformer-winding S, and the tertiary autotransformer-winding M, respectively. In this manner, I provide a very convenient means for setting the mutual impedance of the compensator to have an ohmic value which matches the line-impedance of any given line 11 at any balance-point distance from the relaying station, at which it is desired for the relay to have a zero response or a balance-point. While this particular type of balance-point compensator-adjustment is preferred, I am, of course, not limited altogether thereto.

For the best results, the impedance-angle of the compensator-impedance should match the impedance-angle of the particular transmission-line 11 which it being protected. In accordance with my invention, the accompanying drawing shows a preferred way to adjust the phase-angle relation between the primary current of each compensator and its secondary voltage, without using large values of resistance, and without causing much change in the mutual impedance or the output-voltage of the compensator as a result of changes in the angle-adjustments. To this end, a small percentage of the total number of turns of the secondary winding 15 of each compensator CP are shorted through a variable resistance R1, which can be varied from R1=0, to provide a minimum impedance-angle, to R1=600 ohms, to provide a maximum impedance-angle of approximately 85° (for example); or the resistance R1 may be infinity, or an open circuit, to provide an impedance-angle of substantially 90°. The combination of a small value of resistance R1 and few shorting turns on the secondary winding 15 not only reduces the compensator-burden, but it also results in a minimum change in the mutual impedance when the value of the resistance R1 is changed for the purpose of adjusting the compensator for lines of different impedance-angles. This provides the best means which has heretofore been devised for accomplishing this purpose.

Referring, now, to the phase-fault units $\phi\phi-1$, $\phi\phi-2$ and $\phi\phi-3$ of the three zones, 1, 2 and 3, of the non-carrier type KD relaying system which is shown in the accompanying drawing, it is a characteristic feature of these units, as described and claimed in the above-mentioned Sonnemann application, that each unit uses three identical compensators CP, connected in series with the respective open-delta voltage-terminals $V_A$, $V_B$ and $V_C$ which are supplied by two autotransformers AT. One of these two autotransformers AT has its primary connection across the delta phase $ba$ of the potential-transformer bus $abc$, while the other autotransformer has its primary connection across the delta phase $bc$. The three phase-fault relay-units $\phi\phi-1$, $\phi\phi-2$ and $\phi\phi-3$, are designed to respond to line-to-line faults and to double line-to-ground faults. Said units are all alike, except for their different distance-settings, or the different impedance-settings of their compensators CP, as indicated by the choice of the S-taps 1, 2 and 3, respectively, for the first, second and third zones, as shown in the drawing.

The output-circuits of the two autotransformers AT of each phase-fault relay-unit, such as the unit $\phi\phi-1$, thus provide an adjustable three-phase derived bus-voltage $V_A$, $V_B$, $V_C$. The primary windings T of the three compensators CP of each of these phase-fault units, such as $\phi\phi-1$, are energized from the respective derived line-currents $I_A$, $I_B$ and $I_C$ which are supplied by the line-current transformers CT. The three compensators CP subtract their respective compensator-voltages from the corresponding phases of the derived bus-voltages $V_A$, $V_B$ and $V_C$, producing a three-phase compensated voltage at the points $x'$, $y'$ and $z'$, as shown for the relay-unit $\phi\phi-1$ in Fig. 1.

As described and claimed in Mr. Sonnemann's aforesaid application, the compensated voltages $x'$, $y'$ and $z'$ of each phase-fault relaying-unit, such as $\phi\phi-1$ in the accompanying drawing, are used to energize a suitable type of torque-producing relaying-element which produces no torque at all (that is, it has a balance-point), when the positive and negative-sequence components of the impressed three-phase voltages $x'$, $y'$, $z'$ are equal to each other (which is the case when the voltage-triangle has collapsed to a single line or phase), or when said voltage-triangle has completely collapsed to a point.

Said torque-producing relay-element has an actuating torque when the negative-sequence voltage-component predominates, while it has a restraining or non-actuating torque when the positive-sequence component predominates. Any suitable torque-producing element which answers this basic description will suffice, whether it is a balanced element, like a three-phase induction motor, in which the internal impedances and angular spacings of the element are alike in each phase, or whether said torque-producing element is an unbalanced element, such as a two-circuit element, the two circuits of which are energized from different voltages derived from the impressed three-phase voltages $x'$, $y'$, $z'$.

There are advantages in using a two-circuit torque-producing element, as diagrammatically indicated by the wattmeter type of single-phase relay-element W in each of the six relaying units $\phi\phi-1$, $3\phi-1$, $\phi\phi-2$, $3\phi-2$, $\phi\phi-3$ and $3\phi-3$ as diagrammatically indicated in the drawing. There are various ways in which the two circuits for each of these torque-producing elements may be energized, from any two differing voltages which may be derived from different phases of the three-phase compensated voltages, such as $x'$, $y'$, $z'$.

In the particular circuit-connections which are shown forth $\phi\phi-1$ relay-unit in the accompanying drawing, the two-circuit torque-producing element W has one winding-circuit $xy$ energized across the delta-phase $x'y'$ of the compensated three-phase voltages $x'y'z'$, while its other winding-circuit $zy$ is energized across the delta-voltage phase $z'y'$. If the circuit-connections to and within the two-circuit torque-producing element W are such that no zero-sequence currents can flow in this element, as in the connections shown for the $\phi\phi-1$ unit in the drawing, then the torque-producing element will have no hybrid, balance-point-shifting responses to the product of the zero and positive-sequence relay-currents or to the product of the zero and negative-sequence relay-currents.

In accordance with one feature of my present invention, it is desirable, for best operation, in the phase-fault units, such as $\phi\phi-1$ of the accompanying drawing, to balance both the steady-state and the transient impedance-angles in the three circuits leading up to the common connection $y$ of the wattmeter-element terminals $xyz$. This refers to the impedances which are connected between the bus-voltage terminal $a$ and the relay-terminal $y$, the impedances which are connected between the bus-voltage terminal $b$ and the relay-terminal $y$, and the impedances which are connected between the bus-voltage terminal $c$ and the relay-terminal $y$.

In accordance with my invention, the impedance-angles in these three circuits are kept substantially equal, notwithstanding the angle-changes which are introduced by changing the primary taps S1, S2 and S3 on the auto-transformers AT, by introducing a resistance R2 in circuit between the points $y'$ and $y$, and providing this resistance R2 with three taps, also numbered 1, 2 and 3, which are changed simultaneously with the S-taps of the auto-transformers. Dissimilar transient effects, due to sudden bus-voltage changes in the three circuits $ay$, $by$ and $cy$ are compensated for by serially including capacitors $C_x$ and $C_z$ between the points $x'$ and $x$ and between the points $z'$ and $z$, respectively, to compensate for the inductive reactances in these circuits. The effective values of these angle-adjustment capacitors $C_x$ and $C_z$ are adjustable by means of parallel-connected adjustable resistances $R_x$ and $R_z$, respectively.

These transient-suppressing circuit-portions ($C_x$, $R_x$), R2, and ($C_z$, $R_z$) balance the phase-angles of the impedances of the three circuits $ay$, $by$ and $cy$, with open primaries on the three compensators CP. Thus, when a close-in phase-to-phase fault occurs behind the current transformers CT, one of the delta bus-voltages $V_{AB}$, $V_{BC}$ or $V_{CA}$ is collapsed to zero. If we assume the extreme system-condition of no back-feed current over the line which is being protected, the compensators do nothing to alter this collapsed voltage under this condition, there should be no spurious torque in the relay to cause it to respond incorrectly. The transient-suppressing elements prevent such spurious response as might otherwise be occasioned by the sudden change in the bus-voltages in the extreme case in which there may be no current in the primaries of the compensators.

The accompanying drawing also shows three three-phase-fault-responsive relays $3\phi-1$, $3\phi-2$ and $3\phi-3$, one for each of the three zones. These particular relays embody the basic concept of the previously mentioned invention of S. L. Goldsborough. These three three-phase relays are all alike, except for their distance-settings which are changed in much the same manner as has been described for the phase-fault relays $\phi\phi-1$, $\phi\phi-2$, $\phi\phi-3$, so that a description of one, say the three-phase element $3\phi-1$, will suffice for all.

A principal characteristic feature of this three-phase fault-responsive relay $3\phi-1$, as distinguished from the phase-to-phase fault-responsive relay $\phi\phi-1$, is that the three-phase relay $3\phi-1$ uses only a single compensator CP, which has 1.5 times the effective mutual impedance of each of the three compensators CP which are used in the phase-fault relay $\phi\phi-1$. The phase in which this single compensator CP is connected, in the relay-unit $3\phi-1$ of the drawing, is designated as phase A. This three-phase unit $3\phi-1$ uses a single autotransformer AT, which is similar to the autotransformers which have been described for the phase-fault relay $\phi\phi-1$. This single autotransformer AT is connected between the phases $b$ and $a$ of the relaying bus $abc$, so as to provide the adjustable voltage $V_A$, which is phase A of the three-phase bus-voltages which are used for energizing the torque-producing element W of this three-phase unit $3\phi-1$, the other two bus-voltage phases being the phases $b$ and $c$, unchanged.

In the three-phase unit $3\phi-1$, the single compensator CP has its secondary winding 15, with some of its turns shorted through a mutual-impedance angle-controlling resistor R1, connected in series with the bus-voltage terminal $V_A$, to produce the compensated voltage $x'$, as described for the phase-fault relay $\phi\phi-1$, remembering that the compensator CP in the three-phase relay $3\phi-1$ has an impedance-setting which is 1.5 times as high as in the phase-fault relay $\phi\phi-1$.

In the case of the three-phase relay $3\phi-1$ which is shown in Fig. 1, the compensator-primary T is traversed by the current $-(I_B+I_C)$, which is equal to $(I_A-3I_0)$, where $I_0$ is the zero-sequence component of the line-current, as derived by the current-transformers CT, as described and claimed in the previously mentioned Chevalier application.

The cylinder-unit W, which is used in the three-phase relay-element $3\phi-1$ in Fig. 1, is basically a two-phase induction motor which produces torque in a direction which is determined by the phase-angle between the two voltages, and in a magnitude which is responsive to the product of the two voltages which are impressed upon the torque-producing element. When a three-phase fault occurs close to the bus 12 at the relaying terminal of the protected line 11, all of the delta voltages of the bus will collapse to zero. And since the three-phase element $3\phi-1$ uses only one compensator CP, there will be a voltage $x'$ in only one phase of the three-phase voltages which are supplied to the torque-producing cylinder-unit W, this phase being the phase which contains the compensator CP. This provides energization for the phase-winding $xy$ of the torque-element W. However, the energization for the other phase-winding $zy$ of the torque-element collapses to zero, in response to a three-phase line-fault near the bus, which means that the torque-element, if it responded at all under such conditions, would have only a momentary transient response, as a result of its memory-action as the uncompensated $zy$ voltage is collapsing to zero.

In order that the three-phase fault-responsive unit $3\phi-1$ may react, with accuracy or intelligence, to a three-phase line-fault close to the relaying station 12, it is desirable not only to sustain a sufficient magnitude of the uncompensated bus-voltage zy which is applied to the torque-producing element, so that there can be a sufficient torque to operate the relay, but also to sustain or maintain the proper phase-angle between the two relay-voltages xy and zy, long enough for the relay to react at all, and to know in which direction to react, because the relay-torque is determined by the product of the magnitudes of the impressed voltages, multiplied by the sine of the phase-angle between these two voltages.

In accordance with my invention, the uncompensated zy voltage on the torque-element W of the three-phase unit 3ϕ–1 is sustained, for a sufficiently long time, by a memory-circuit comprising a serially connected capacitor C1 and an adjustable choke-coil X1, connected in series between the bus-terminal c and the terminal z of the torque-producing element W. It is necessary that the duration or decrement of the memory-action of this memory-circuit C1, X1 shall be sufficiently long to enable the torque-element to produce any torque at all by the end of the time within which said torque-element must accurately respond, but it is also necessary that the tuning of the circuit which includes the memory-circuit C1, X1 shall be substantially equal to the line-frequency of the protected line 11, so that the oscillating current in this tuned circuit will not get much out of phase with the corresponding line-frequency current, during the number of line-frequency cycles during which it is necessary for the torque-element to respond, with a positive torque for faults in front of the relaying station, or with a negative torque for faults behind the relaying station.

However, the introduction of the capacitor C1 of the memory-circuit in the relaying unit 3ϕ–1 necessarily introduces a transient disturbance, which is suppressed or compensated for, in accordance with my invention, by connecting a second capacitor C2 between the points $x'$ and $x$, in the compensated-voltage phase $x$ of said torque-element 3ϕ–1, this second capacitor C2 being shunted by a resistor R2' which not only enhances the effect of the capacitor C2, but also enables said capacitor to suppress transients with as little memory-action as possible.

The relaying equipment which is shown in the drawing requires a timer, such as TD, which is available whenever there is a line-fault involving at least two of the line-phases. While I am not limited as to exact details, I prefer to use a single-phase timer TD, which receives an energizing current whenever a fault-current is flowing, involving at least two of the line-phases. By way of example, I have shown the timer TD as being a motor-element M which is energized from a saturable many-turn current-transformer CT–T, which is in turn energized, for example, by the difference of the line-currents $I_B$ and $I_C$.

The timer-motor TD is connected in series with the normally open make-contact TX of an auxiliary timer-relay TX. This make-contact TX is bypassed by a resistance R3, which is sufficiently small to avoid substantially open-circuiting the current-transformer CT–T when said contact TX is open, but the resistance R3 is sufficiently large to prevent the timer TD from operating when said resistance is connected in series with it.

The six fault-responsive elements have correspondingly numbered make-contacts ϕϕ–1, 3ϕ–1, ϕϕ–2, 3ϕ–2, ϕϕ–3 and 3ϕ–3, which are used to control certain relaying-circuits which are shown as being energized from a positive direct-current bus (+).

The first circuit which is connected to the positive bus (+) is a first-zone tripping-circuit which includes the operating-coil of a contactor-switch CS1, then a circuit 17, then the make-contact ϕϕ–1 of the first-zone phase-fault unit ϕϕ–1, then a tripping circuit 18, which extends up through the trip-coil TC of the circuit breaker CB, and finally through an auxiliary circuit-breaker make-contact CB$a'$ to a negative bus (−), the circuit-breaker make-contact CB$a'$ being closed when the circuit breaker CB is closed, the circuits being illustrated, however, with all switches and relays open or deenergized. Two branch-circuits are also provided between the points 17 and 18 of the first-zone protective-relaying equipment, these two branch-circuits including, respectively, the make-contact 3ϕ–1 of the first-zone three-phase unit 3ϕ–1, and the make-contact CS1 of the contactor-switch CS1.

A second-zone relaying-circuit is next shown, extending from the positive bus (+) through the energizing-coil CS2 of a second contactor-switch CS2, then to a circuit 19, then through the make-contact ϕϕ–2 of the second zone phase-fault unit ϕϕ–2 to a circuit 20, then through a resistor R4 and through an operating-coil TX–2 of the auxiliary timer-relay TK to a circuit 21, which extends up through an auxiliary make-contact CB$a$ of the circuit breaker CB, and thence to the negative bus (−). The two circuits 19 and 20 are joined also by a branch-circuit which includes the make-contact 3ϕ–2 of the second-zone three-phase unit 3ϕ–2. Consequently, the circuit 20 is energized as a result of the response of either one of the two second-zone units ϕϕ–2 or 3ϕ–2. This circuit 20 thus energizes the auxiliary timer-relay TX, which initiates the movement of the timer TD, whenever there is a line-fault which activates either one of the second-zone relays.

The aforesaid circuit 20 is also used to trip the circuit breaker CB at the end of a predetermined time which is determined by the closure of the second-zone contact TD2 of the timer TD, which thereupon energizes the trip-circuit 18 from the circuit 20. The TX coil, either because of its built-in resistance, or because of an externally connected resistance R4, does not draw sufficient current from the circuit 20 to pick up the second contactor-switch CS2, but the trip-coil TC draws a very heavy current as soon as the second-zone timer-contact TD2 closes, thus causing the second contactor-switch CS2 to pick up and close its make-contact CS2, which completes a circuit-connection between the circuits 19 and 18, thus sealing-in the second-zone tripping-response.

A third relaying-circuit is connected from the positive bus (+) through the operating-coil of a third contactor-switch CS3, then to a circuit 22, then to two branch-circuits, one extending from the circuit 22 through the make-contact ϕϕ–3 of the third-zone phase-fault unit ϕϕ–3 to a circuit 23, the second branch-circuit extending from the circuit 22 through a make-contact 3ϕ–3 of the third-zone three-phase unit 3ϕ–2 to said circuit 23. From the circuit 23, a first branch-circuit continues through a second operating-coil TX–3 of the auxiliary timer-relay TX, and thence to the circuit 21 so that the auxiliary timer-relay TX will initiate the movement of the timer TD whenever there is a line-fault which activates either one of the third-zone relays.

A second branch-circuit of the circuit 23 is provided, to make connection to a third-zone timer-contact TD3 which closes after a longer time-interval than is required for the closure of the second-zone contact TD2 of the timer TD. The third-zone timer-contact TD3 energizes the trip-circuit 18 from the circuit 23, and when this happens, the third contactor switch CS3 is energized, picking up its make-contact CS3, and closing a circuit-connection between the conductors 22 and 18.

At the bottom of the drawing, the positive bus (+) is shown as being energized, through a battery-switch BS, from the positive terminal of a battery BAT, the negative terminal of which is grounded, to connect with the grounded negative bus (−).

My present invention relates to the preferred adjustment-features which are used in the compensator relaying-units which are shown in the accompanying drawing, although the basic principles of these units, without the special adjustments, originated with other inventors, as has been noted in the foregoing description. The natures, purposes and modes of operation of my various adjustment-features have been noted during the process of the description, but perhaps the following additional remarks, in summary, may be helpful.

The means for adjusting the phase-angles of all of the compensators CP, so that the effective compensator-impedance can be adjusted to have the same phase-angle as the line-impedance of the particular power-line 11 which is being protected, involves the use of a small adjustable resistor R1 which is connected across a small number of the turns of the secondary winding 15 of each compensator CP. The introduction of this novel expedient has provided an extremely simple means for adjusting the secondary impedance of the compensator without introducing an unacceptable amount of change in the mutual reactance between the primary and secondary windings of the compensator, that is, without introducing an unacceptable amount of change in the reactive part of the effective compensator-impedance.

The importance of this kind of phase-angle adjustment, which does not change the magnitude of the compensator-impedance more than can be tolerated within acceptable limits of accuracy, will be understood when it is noted that this single feature makes it possible, once the phase-angle of the compensator-impedance has been properly adjusted, to proceed to change the magnitude of the compensator-impedance, so as to set the compensator for different values of the line-impedances of different lines, out to different distances which are to be chosen as the balance-points of the respective relays, without paying any more attention to the phase-angle adjustment. Thus, my phase-angle adjustment-means makes it possible to vary the effective value of the magnitude of the compensator-impedance, by either varying the voltage-ratio between the line-voltage and the voltage which is used in connection with the compensator, or varying the turn-ratio between the primary and secondary turns of the compensator. Actually, my illustrated preferred system varies both of these ratios, as provided by the rough-adjustment taps S1, S2 and S3 on the autotransformers AT, the fine-adjustment or vernier-taps on the tertiary windings M on the autotransformers AT, and the primary-winding taps T on the compensators CP.

My present invention also involves transient-suppressing circuits for both the phase-fault elements $\phi\phi$ and the three-phase elements $3\phi$.

The transient-suppressing circuits of the phase-fault relays $\phi\phi$ involve the use of a resistor R2, having adjustment-taps numbered 1, 2 and 3, in the relay-phase in which the voltage-adjustments of the autotransformers AT are not used, so that the resistance-taps 1, 2 and 3 can be adjusted to correspond to the autotransformer S-taps, in order to compensate for the variations in the effective resistance in the other two phases when the autotransformer S-taps are changed. The transient-adjusting circuits of said phase-fault relays $\phi\phi$ also include the use of serially connected capacitors $C_x$ and $C_z$, in the other two phases of the element, these capacitors being paralleled by adjustable resistances $R_x$ and $R_z$, respectively, whereby fine adjustments may be made as to the effectiveness or effective values of the capacitors $C_x$ and $C_z$, and whereby the impedances of all three phases of the element may be matched in phase. Consequently, when a line-to-line fault occurs across any two of the line-phases, at a point close to the bus (thus practically short-circuiting two of the line-to-neutral bus-voltages), the two-parallel-connected relay-circuits which are connected to these two short-circuited bus-voltages will not have out-of-phase currents therein, which would produce false or spurious relay-responses.

My transient-suppressing circuits which are associated with the three-phase fault-responsive element $3\phi$ are needed because of the desirability (as a rule) of providing these relays with a memory-action which will delay the shrinkages of the bus-voltages (as applied to the torque-element), for a time long enough for the relay to know or remember the phase-angle of at least one of the bus-voltages before the bus-voltages completely collapse as a result of a three-phase fault practically at the bus. According to my invention, such a memory-action is provided without introducing serious differences in the steady-state impedances or impedance-angles of the three supply-circuit phases of the relay, and also without introducing faulty relay-operations due to different transient responses of said three phases to sudden voltage-changes. I have accomplished this result by connecting a series capacitor-inductance memory-element C1, X1, accurately tuned to the line-frequency, in phase $z$ of the relay, and by introducing, in phase $x$, a transient-suppressor in the form of a capacitor C2, permanently shunted by a resistor R2, for suppressing transients with as little memory-action as possible.

In the preceding description of the fault-responsive units, such as the phase-to-phase unit $\phi\phi$-1 in the drawing, I have stated that the effective impedance of certain compensators is equal to the line-impedance to a fault at the desired balance point. This statement really presupposes that the line has a single impedance, which is the same in all three of the line-conductors A, B and C, which is true of a well-constructed balanced transmission-line in which there is adequate transposition of the phase-wires. In the case of a non-transposed transmission-line, the reactance parts of the impedances of the three line-wires will not all be the same, and it must be understood, in such a case, that each such compensator could be set to match the impedance of its own line-wire. I wish my description to read with this explanation in mind.

In the preceding description of the coincidence of the phase-angle of the compensator voltage-drop with the phase-angle of the voltage to which the compensator voltage-drop is being added or subtracted, I have really been assuming the general case in which the impedance of the fault itself is negligibly small, so that the voltage between the faulted phases is zero at the fault.

While I have illustrated my invention in a single preferred form of embodiment, and while I have explained the general principles of its design and operation in the best form and manner at present visualized, I wish it to be understood that the foregoing illustration, description and explanations are only by way of example, and were not intended as limitations, in the sense that it is possible to substitute various equivalents, or to add certain additional refinements, or to omit certain of the illustrated refinements which may not be needed in any particular case, without departing from the essential spirit of my invention.

I claim as my invention:

1. An adjustable line-drop compensator adapted for use on diverse alternating-current lines which have diverse impedance-angles, comprising an inductive reactance device having a primary winding adapted to be traversed by a line-current, a secondary winding of many turns, in which a compensator-voltage will be induced, and an adjustable resistance connected as an adjustable shunt around a very small portion only of the secondary turns, whereby the effective phase-angle of the compensator-impedance may be adjusted to match the phase-angle of the line-impedance, without substantially changing the effective magnitude of the compensator-impedance as a result of said phase-angle adjustment.

2. An adjustable line-drop compensator adapted for use on diverse alternating-current lines which have diverse impedance-angles, comprising an inductive reactance device having a primary winding adapted to be traversed by a line-current, a secondary winding of many turns, in which a compensator-voltage will be induced, an adjustable resistance connected as an adjustable shunt around a very small portion only of the secondary turns, whereby the effective phase-angle of the compensator-impedance may be adjusted to match the phase-angle of the line-impedance, without substantially changing the effective magnitude of the compensator-impedance as a result of said phase-angle adjustment, and a means, including adjustable taps on the primary winding, for changing the effective magnitude of the compensator-impedance, without substantially changing the effective phase-angle of the compensator-impedance as a result of said magnitude-adjustment.

3. A compensator relaying assembly, adapted for use in protecting diverse three-phase transmission-lines against certain kinds and diverse locations of faults, comprising: a voltage-deriving means, adapted to be energized from the line-voltage at the relaying station, for producing a set of derived polyphase voltages having three circuits having a phase-sequence corresponding to the line-voltages; a compensating-means, including a compensator connected in series with a phase of said derived polyphase voltages for producing a set of compensated polyphase voltages; an energizing means, for energizing said compensator proportionately to the line-current which flows in a line-conductor of the three-phase transmission-line; and a polyphase-responsive relaying element, energized from the three circuits of said compensated polyphase voltages, for controlling an electrical circuit when the compensated polyphase voltages have a negative sequence of phases; said assembly being characterized by: said compensator being an inductive reactance device, having a primary winding energized from the aforesaid energizing-means, and having a secondary winding of many turns, connected in series-circuit relation between said voltage-deriving means and said relaying-element; and an adjustable resistance connected as an adjustable shunt around a very small portion only of the secondary turns, whereby the effective phase-angle of the compensator-impedance may be adjusted to match the phase-angle of the line-impedance, without substantially changing the effective magnitude of the compensator-impedance as a result of said phase-angle adjustment; said voltage-deriving means including a means for changing the magnitude of the derived voltage in the phase in which said compensator is connected, for changing the effective magnitude of the compensator-impedance, without substantially changing the effective phase-angle of the compensator-impedance as a result of said magnitude-adjustment.

4. A compensated-voltage relaying unit for responding to certain faults on a three-phase transmission-line, said unit including: a voltage-deriving means, energized from the line-voltage at the relaying station, for producing a set of derived polyphase voltages having three circuits having a phase-sequence corresponding to the line-voltages; a set of three compensators, connected in series-circuit relation to the respective phases of said derived polyphase voltages; and a polyphase-responsive relaying element, energized from the three circuits of said compensated polyphase voltages, for controlling an electrical circuit when the compensated polyphase voltages have a negative sequence of phases; said unit being characterized by: each of said compensators being an inductive reactance device, having a primary winding energized proportionately to its corresponding line-current, and having a secondary winding of many turns, the three secondary windings being respectively connected in series-circuit relation in the three circuits between three terminals of said voltage-deriving means and three terminals of said relaying element; and an adjustable resistance connected as an adjustable shunt around a very small portion only of each of the secondary windings, whereby the effective phase-angle of the compensator-impedance may be adjusted to match the phase-angle of the line-impedance, without substantially changing the effective magnitude of the compensator-impedance as a result of said phase-angle adjustment; said voltage-deriving means including a means for changing the magnitude of two of the derived voltages, for thereby changing the effective magnitude of the three compensator-impedances, without substantially changing the effective phase-angle of the compensator-impedance as a result of said magnitude-adjustment.

5. A compensator-voltage relaying unit for responding to certain faults on a three-phase transmission-line, said unit including: a voltage-deriving means, energized from said unit including: a voltage-deriving means, energized from the line-voltage at the relaying station, for producing a set of derived polyphase voltages having three circuits having a phase-sequence corresponding to the line-voltages; a set of three compensators, connected in series-circuit relation to the respective phases of said derived polyphase voltages; and a polyphase-responsive relaying element, energized from the three circuits of said compensated polyphase voltages for controlling an electrical circuit when the compensated polyphase voltages have a negative sequence of phases; said unit being characterized by: each of said compensators being an inductive reactance device, having a primary winding energized proportionately to its corresponding line-current, and having a secondary winding of many turns, the three secondary windings being respectively connected in series-circuit relation in the three circuits between three terminals of said voltage-deriving means and three terminals of said relaying element; an adjustable resistance connected as an adjustable shunt around a very small portion only of each of the secondary windings, whereby the effective phase-angle of the compensator-impedance may be adjusted to match the phase-angle of the line-impedance, without substantially changing the effective magnitude of the compensator-impedance as a result of said phase-angle adjustment; said voltage-deriving means including a means for changing the magnitude of two of the derived voltages, for thereby changing the effective magnitude of the three compensator-impedances, without substantially changing the effective phase-angle of the compensator-impedance as a result of said magnitude-adjustment; and balancing-impedances, connected in series-circuit relation to a plurality of the three circuits containing the secondary windings of the three compensators, for balancing the impedance-angles of said three circuits.

6. A compensated-voltage relaying unit for responding to certain faults on a three-phase transmission line, said unit including: a voltage-deriving means, energized from the line-voltage at the relaying station, for producing a set of derived polyphase voltages having three circuits having a phase-sequence corresponding to the line-voltages; a set of three compensators, connected in series-circuit relation to the respective phases of said derived polyphase voltages; and a polyphase-responsive relaying element, energized from the three circuits of said compensated polyphase voltages, for controlling an electrical circuit when the compensated polyphase voltages have a negative sequence of phases; said unit being characterized by: each of said compensators being an inductive reactance device, having a primary winding energized proportionately to its corresponding line-current, and having a secondary winding of many turns, the three secondary windings being respectively connected in series-circuit relation in the three circuits between three terminals of said voltage-deriving means and three terminals of said relaying element; an adjustable resistance connected as an adjustable shunt around a very small portion only of each of the secondary turns, whereby the effective phase-angle of the compensator-impedance may be adjusted to match the phase-angle of the line-impedance, without substantially changing the effective magnitude of the compensator-impedance as a result of said phase-angle adjustment; said voltage-deriving means including two variable-ratio transformer-means, in two of said three circuits, for changing the magnitude of two of the derived voltages, for thereby changing the effective magnitude of the three compensator-impedances, without substantially changing the effective phase-angle of the compensator-impedance as a result of said magnitude-adjustment; and balancing-impedances, connected in series-circuit relation to a plurality of the three circuits containing the secondary windings of the three compensators, for balancing the impedance-angles and the transient effects of said three circuits; said balancing-impedances including a capacitor, shunted by an adjustable resistance, connected in series with each of the two circuits containing said two variable-ratio transformer-means, and a variable resistor connected in series with the third circuit.

7. A compensated-voltage three-phase-fault-responsive relaying unit for responding to three-phase faults on a three-phase transmission-line, said unit including: a voltage-deriving means, energized from the line-voltage at the relaying station, for producing a set of derived polyphase voltages having three circuits having a phase-sequence corresponding to the line-voltages; a compensator, connected in series-circuit relation to one phase of said derived polyphase voltages for producing a set of compensated polyphase voltages; and a polyphase-responsive relaying element, energized from the three circuits of said compensated voltages, for controlling an electrical circuit when the compensated voltages have a negative sequence of phases; said unit being characterized by: said compensator being an inductive reactance device, having a primary winding energized proportionately to its corresponding line-current, and having a secondary winding of many turns, connected in series-circuit relation in said phase in which the compensator is connected; an adjustable resistance connected as an adjustable shunt around a vary small portion only of the secondary turns, whereby the effective phase-angle of the compensator-impedance may be adjusted to match the phase-angle of the line-impedance, without substantially changing the effective magnitude of the compensator-impedance as a result of said phase-angle adjustment; and said voltage-deriving means including a variable-ratio transformer-means in the derived-voltage circuit having said compensator in it, for changing the magnitude of said phase of the derived voltages, for thereby changing the effective magnitude of the compensator-impedance.

8. A compensated-voltage three-phase-fault-responsive relaying unit for responding to three-phase faults on a three-phase transmission-line, said unit including: a voltage-deriving means, energized from the line-voltage at the relaying station, for producing a set of derived polyphase voltages having three circuits having a phase-sequence corresponding to the line-voltages; a compensator, connected in series-circuit relation to one phase of said derived polyphase voltages for producing a set of compensated polyphase voltages; and a polyphase-responsive relaying element, energized from the three circuits of said compensated voltages, for controlling an electrical circuit when the compensated voltages have a negative sequence of phases; said unit being characterized by: said compensator being an inductive reactance device, having a primary winding energized proportionately to its corresponding line-current, and having a secondary winding of many turns, connected in series-circuit relation in said phase in which the compensator is connected; an adjustable resistance connected as an adjustable shunt around a very small portion only of the secondary turns, whereby the effective phase-angle of the compensator-impedance may be adjusted to match the phase-angle of the line-impedance, without substantially changing the effective magnitude of the compensator-impedance as a result of said phase-angle adjustment; said voltage-deriving means including a variable-ratio transformer-means in the derived-voltage circuit having said compensator in it, for changing the magnitude of said phase of the derived voltage, for thereby changing the effective magnitude of the compensator-impedance; a memory-circuit means, associated with at least one of the three circuits of the derived polyphase voltages, for producing a long decrement in the collapse of said derived voltage; and a balancing-impedance means, associated with at least one other of the three circuits of the derived polyphase voltages, for delaying any shift in the relative phases of the compensated voltages after the collapse of the line-voltage at the relaying station.

9. A compensated-voltage three-phase-fault-responsive relaying unit for responding to three-phase faults on a three-phase transmission-line, said unit including: a voltage-deriving means, energized from the line-voltage at the relaying station, for producing a set of derived polyphase voltages having three circuits having a phase-sequence corresponding to the line-voltages; a compensator, connected in series-circuit relation to one phase of said derived polyphase voltages for producing a set of compensated polyphase voltages; and a two-circuit polyphase-responsive relaying element, having a first one of its two circuits connected to the derived-voltage circuit having the compensator in it, said relaying element having its other circuit connected across both of the other two derived-voltage circuits, said relaying element controlling an electrical circuit when the compensated voltages have a negative sequence of phases; said unit being characterized by: said compensator being an inductive reactance device, having a primary winding energized proportionately to its corresponding line-current, and having a secondary winding of many turns, connected in series-circuit relation in said phase in which the compensator is connected; an adjustable resistance connected as an adjustable shunt around a very small portion only of the secondary turns, whereby the effective phase-angle of the compensator-impedance may be adjusted to match the phase-angle of the line-impedance, without substantially changing the effective magnitude of the compensator-impedance as a result of said phase-angle adjustment; said voltage-deriving means including a variable ratio transformer-means in the derived-voltage circuit having said compensator in it, for changing the magnitude of said phase of the derived voltage, for thereby changing the effective magnitude of the compensator-impedance; a memory-circuit means, including a serially connected capacitor, associated with a derived-voltage circuit which is not connected to said first circuit of the relaying element, for producing a long decrement in the collapse of said derived voltage; and a balancing-impedance means, including a serially connected capacitor, shunted by a resistor, associated with the circuit having the compensator in it, for delaying any shift in the relative phases of the compensated voltages after the collapse of the line-voltage at the relaying station.

10. A compensated-voltage three-phase-fault-responsive relaying unit for responding to three-phase faults on a three-phase transmission line, said unit including: a voltage-deriving means, energized from the line-voltage at the relaying station, for producing a set of derived polyphase voltages having three circuits having a phase-sequence corresponding to the line-voltages; a compensator, connected in series-circuit relation to one phase of said derived polyphase voltages for producing a set of compensated polyphase voltages; and a polyphase-responsive relaying element, energized from the three circuits of said compensated voltages, for controlling an electrical circuit when the compensated voltages have a negative sequence of phases; said unit being characterized by: said voltage-deriving means including a variable-ratio transformer-means in the derived-voltage circuit having said compensator in it, for changing the magnitude of said phase of the derived voltage, for thereby changing the effective magnitude of the compensator-impedance; a memory-circuit means, associated with at least one of the three circuits of the derived polyphase voltages, for producing a long decrement in the collapse of said derived voltage; and a balancing-impedance means, associated with at least one other of the three circuits of the derived polyphase voltages, for delaying any shift in the relative phases of the compensated voltages after the collapse of the line-voltage at the relaying station.

11. A compensated-voltage three-phase-fault-responsive relaying unit for responding to three-phase faults on a three-phase transmission-line, said unit including: a voltage-deriving means, energized from the line-voltage at the relaying station, for producing a set of derived polyphase voltages having three circuits having a phase-sequence corresponding to the line-voltages; a compensator, connected in series-circuit relation to one phase of said derived polyphase voltages for producing a set of compensated polyphase voltages; and a two-circuit polyphase-responsive relaying element, having a first one of its two circuits connected to the derived-voltage circuit having the compensator in it, said relaying element having its other circuit connected across both of the other two derived-voltage circuits, said relaying element controlling an electrical circuit when the compensated voltages have a negative sequence of phases; said unit being characterized by: said voltage-deriving means including a variable-ratio transformer-means in the derived-voltage circuit having said compensator in it, for changing the magnitude of said phase of the derived voltage, for thereby changing the effective magnitude of the compensator-impedance; a memory-circuit means, including a serially connected capacitor, associated with a derived-voltage circuit which is not connected to said first circuit of the relaying element, for producing a long decrement in the collapse of said derived voltage; and a balancing-impedance means, including a serially connected capacitor, shunted by a resistor, associated with the circuit having the compensator in it, for delaying any shift in the relative phases of the compensated voltages after the collapse of the line-voltage at the relaying station.

12. A compensated-voltage relaying unit for responding to certain faults on a three-phase transmission line, said unit including: a voltage-deriving means, energized from the line-voltage at the relaying station, for producing a set of derived polyphase voltages having three circuits having a phase-sequence corresponding to the line-voltages; a set of three compensators, connected in series-circuit relation to the respective phases of said derived polyphase voltages; and a polyphase-responsive relaying element, energized from the three circuits of said compensated polyphase voltages, for controlling an electrical circuit when the compensated polyphase voltages have a negative sequence of phases; said unit being characterized by: each of said compensators being an inductive reactance device, having a primary winding energized proportionately to its corresponding line-current, and having a secondary winding of many turns, the three secondary windings being respectively connected in series-circuit relation in the three circuits between three terminals of said voltage-deriving means and three terminals of said relaying element; and a separate adjustable resistor included in each of two of said three circuits.

13. A compensated-voltage relaying unit for responding to certain faults on a three-phase transmission line, said unit including: a voltage-deriving means, energized from the line-voltage at the relaying station, for producing a set of derived polyphase voltages having three circuits having a phase-sequence corresponding to the line-voltages; a set of three compensators, connected in series-circuit relation to the respective phases of said derived polyphase voltages; and a polyphase-responsive relaying element, energized from the three circuits of said compensated polyphase voltages, for controlling an electrical circuit when the compensated polyphase voltages have a negative sequence of phases; said unit being characterized by: each of said compensators being an inductive reactance device, having a primary winding energized proportionately to its corresponding line-current, and having a secondary winding of many turns, the three secondary windings being respectively connected in series-circuit relation in the three circuits between three terminals of said voltage-deriving means and three terminals of said relaying element, and a separate adjustable resistor included in each of two of said three circuits, and a separate capacitor connected across each of said resistors to compensate for the inductance of the associated circuit.

14. A compensated-voltage relaying unit for responding to certain faults on a three-phase transmission line, said unit including: a voltage-deriving means, energized from the line-voltage at the relaying station, for producing a set of derived polyphase voltages having three circuits having a phase-sequence corresponding to the line-voltages; a set of three compensators, connected in series-circuit relation to the respective phases of said derived polyphase voltages; and a polyphase-responsive relaying element, energized from the three circuits of said compensated polyphase voltages, for controlling an electrical circuit when the compensated polyphase voltages have a negative sequence of phases; said unit being characterized by: each of said compensators being an inductive reactance device, having a primary winding energized proportionately to its corresponding line-current, and having a secondary winding of many turns, the three secondary windings being respectively connected in series-circuit relation in the three circuits between three terminals of said voltage-deriving means and three terminals of said relaying element, said voltage-deriving means including variable-ratio transformer-means adjustable for varying the magnitudes of the derived voltages, said three circuits including first and second circuits and a third circuit common to the first and second circuits, and adjustable resistance-means in said third circuit which is adjustable to compensate for changes in resistance due to adjustment of said transformer-means.

15. A compensated-voltage relaying unit for responding to certain faults on a three-phase transmission line, said unit including: a voltage-deriving means, energized from the line-voltage at the relaying station, for producing a set of derived polyphase voltages having three circuits having a phase-sequence corresponding to the line-voltages; a set of three compensators, connected in series-circuit relation to the respective phases of said derived polyphase voltages; and a polyphase-responsive relaying element, energized from the three circuits of said compensated polyphase voltages, for controlling an electrical circuit when the compensated polyphase voltages have a negative sequence of phases; said unit being characterized by: each of said compensators being an inductive reactance device, having a primary winding energized proportionately to its corresponding line-current, and having a secondary winding of many turns, the three secondary windings being respectively connected in series-circuit relation in the three circuits between three terminals of said voltage-deriving means and three terminals of said relaying element, said voltage-deriving means including variable-ratio transformer-means adjustable for varying the magnitudes of the derived voltages, said three circuits including first and second circuits and a third circuit common to the first and second circuits, and adjustable balancing means included in at least one of said first and second circuits for adjusting the balance of the first and second circuits.

16. A compensated-voltage relaying unit for responding to certain faults on a three-phase transmission line, said unit including: a voltage-deriving means, energized from the line-voltage at the relaying station, for producing a set of derived polyphase voltages having three circuits having a phase-sequence corresponding to the line-voltages; a set of three compensators, connected in series-circuit relation to the respective phases of said derived polyphase voltages; and a polyphase-responsive relaying element, energized from the three circuits of said compensated polyphase voltages, for controlling an electrical circuit when the compensated polyphase voltages have a negative sequence of phases; said unit being characterized by: each of said compensators being an inductive reactance device, having a primary winding energized proportionately to its corresponding line-current, and having a secondary winding of many turns, the three secondary windings being respectively connected in series-circuit relation in the three circuits between three terminals of said voltage-deriving means and three terminals of said relaying element, said voltage-deriving means including variable-ratio transformer-means adjustable for varying the magnitudes of the derived voltages, said three circuits including first and second circuits and a third circuit common to the first and second circuits, and adjustable resistance-means in said third circuit which is adjustable to compensate for changes in resistance due to adjustment of said transformer-means, a separate adjustable balancing resistor included in each of the first and second circuits and a separate capacitor connected across each of said balancing resistors for substantially compensating the inductance of the associated circuit.

References Cited in the file of this patent

UNITED STATES PATENTS

| | | |
|---|---|---|
| 2,221,602 | Parsons | Nov. 12, 1940 |
| 2,295,398 | Griscom | Sept. 8, 1942 |
| 2,393,983 | Goldsborough | Feb. 5, 1946 |
| 2,408,208 | Goldsborough | Sept. 24, 1946 |
| 2,426,026 | Sonneman | Aug. 19, 1947 |
| 2,445,429 | Goldsborough | July 20, 1948 |
| 2,479,345 | Goldsborough | Aug. 16, 1949 |

FOREIGN PATENTS

| | | |
|---|---|---|
| 585,516 | Great Britain | Feb. 10, 1947 |